US008270527B2

(12) United States Patent
Castelain et al.

(10) Patent No.: US 8,270,527 B2
(45) Date of Patent: Sep. 18, 2012

(54) SC-QOSTFBC CODES FOR MIMO TRANSMITTERS

(75) Inventors: Damien Castelain, Rennes Cedex (FR); Loic Brunel, Rennes Cedex (FR); David Mottier, Rennes Cedex (FR); Cristina Ciochina, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 445 days.

(21) Appl. No.: 12/526,985

(22) PCT Filed: Jan. 25, 2008

(86) PCT No.: PCT/EP2008/000578
§ 371 (c)(1),
(2), (4) Date: Sep. 14, 2009

(87) PCT Pub. No.: WO2008/098672
PCT Pub. Date: Aug. 21, 2008

(65) Prior Publication Data
US 2010/0091903 A1 Apr. 15, 2010

(30) Foreign Application Priority Data

Feb. 15, 2007 (EP) .................................. 07003191
Mar. 30, 2007 (EP) .................................. 07006681

(51) Int. Cl.
*H04L 27/00* (2006.01)
(52) U.S. Cl. ........................................ 375/295; 375/299
(58) Field of Classification Search .................. 375/295, 375/299
See application file for complete search history.

(56) References Cited

U.S. PATENT DOCUMENTS

| 6,834,043 | B1* | 12/2004 | Vook et al. .................. 370/310 |
| 2004/0052315 | A1* | 3/2004 | Thielecke et al. ............ 375/299 |
| 2006/0078066 | A1 | 4/2006 | Yun et al. |

FOREIGN PATENT DOCUMENTS

EP 1 679 816 7/2006

OTHER PUBLICATIONS

U.S. Appl. No. 12/526,551, filed Aug. 10, 2009, Castelain, et al.
U.S. Appl. No. 12/526,849, filed Sep. 16, 2009, Castelain, et al.
Ciochina, C. et al., "A Novel Space-Frequency Coding Scheme for Single Carrier Modulations", The 18$^{th}$ Annual IEEE International Symposium on Personal, Indoor and Mobile Radio Communication (PIMRC'07), pp. 1-5, XP031168487, (2007).
Papadias, C.B. et al."A Space-Time Coding Approach for Systems Employing Four Transmit Antennas", IEEE, pp. 2481-2484, XP010803279, (2001).

* cited by examiner

*Primary Examiner* — Shuwang Liu
*Assistant Examiner* — Michael Neff
(74) *Attorney, Agent, or Firm* — Oblon, Spivak, McClelland, Maier & Neustadt, L.L.P.

(57) ABSTRACT

A SC-QOSTFBC (Single Carrier-Quasi Orthogonal Space Time Frequency Block Code) for 4 transmit antennas in the domain of wireless communication, and coding and decoding schemes useful in the context of MIMO (Multiple Input Multiple Output) or MISO (Multiple Input Single Output) communications especially used in conjunction of OFDM-like transmission schemes. These codes are based on sending on a first antenna a constellation corresponding to what would be sent in a mono antenna scheme, and sending equivalent constellations on the other antennas. The codes are designed to keep a low-PAPR property at each transmit antenna when associated with DFT spread OFDM.

15 Claims, 16 Drawing Sheets

|     | Tx1 | Tx2   | Tx3        | Tx4       | Tx5        | Tx6        | Tx7        | Tx8        |
|-----|-----|-------|------------|-----------|------------|------------|------------|------------|
| Tx1 | *   | SC(p) | Shift(M/2) | SC(p-M/2) | Shift(M/4) | SC(p-M/4)  | Shift(-M/4)| SC(p+M/4)  |
| Tx2 |     | *     | -SC(p+M/2) | Shift(M/2)| -SC(p+M/4) | Shift(-M/4)| -SC(p-M/4) | Shift(M/4) |
| Tx3 |     |       | *          | SC(p)     | Shift(-M/4)| SC(p+M/4)  | Shift(M/4) | SC(p-M/4)  |
| Tx4 |     |       |            | *         | -SC(p-M/4) | Shift(M/4) | -SC(p+M/4) | Shift(-M/4)|
| Tx5 |     |       |            |           | *          | SC(p)      | Shift(M/2) | SC(p-M/4)  |
| Tx6 |     |       |            |           |            | *          | -SC(p-M/2) | Shift(M/2) |
| Tx7 |     |       |            |           |            |            | *          | SC(p)      |
| Tx8 |     |       |            |           |            |            |            | *          |

Fig. 9

SC-QOSTFBC CODES FOR MIMO TRANSMITTERS

The invention concerns the domain of wireless communication, and more specifically the coding and decoding schemes useful in the context of MIMO (Multiple Input Multiple Output) or MISO (Multiple Input Single Output) communications especially used in conjunction of OFDM-like transmission schemes.

Orthogonal Frequency-Division Multiplexing (OFDM), like Coded OFDM (COFDM), is based upon the principle of frequency-division multiplexing (FDM), but is implemented as a digital modulation scheme. The bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross talk between the sub-channels is eliminated. This orthogonality occurs when sub-carriers are equally spaced by the symbol rate of a sub-carrier.

The primary advantage of OFDM is its ability to cope with severe channel conditions, for example, multipath and narrowband interference, without complex equalization filters. Channel equalization is simplified by using many slowly modulated narrowband signals instead of one rapidly modulated wideband signal.

A variation called DFT spread OFDM has been developed. In this system, each symbol to be transmitted is spread over a set of transmitted frequencies by a DFT (Discrete Fourier Transform), the resulting signal is sent over a conventional OFDM transmission system.

FIG. 1 illustrates the coding implementation in the frequency domain for the transmitter. Actual implementation could be done either in the frequency domain or in the time domain while the implementation in the frequency domain should be preferred for simplicity, especially if a MIMO scheme is used, and to improve frequency separability between emitters emitting in different frequency bands. Data to be transmitted are coded and mapped on symbols by the coding and modulation module 1.1 giving a set of symbols $x_n$. Then, the signal is spread in the frequency domain by the FFT (Fast Fourier Transform) module 1.2. Then occurs a step of frequency mapping 1.3 which can comprise zero insertion, equivalent to oversampling in the time domain, frequency shaping, frequency transposition, and possibly filtering. When comprising zero insertion, the output of the frequency mapping module 1.3 results in a vector of size N' greater than N, if not N'=N which is assumed in the following for simplicity and without loss of generality. The signal is transformed back in the time domain by the IFFT (Inverse Fast Fourier Transform) 1.4 for transmission, giving back a set of symbols $x'_n$ very close, if not equal, to the $x_n$ symbols. An optional cyclic prefix insertion 1.5 can be applied before transmission.

FIG. 2 illustrates the decoding implementation in the frequency domain for the receiver. Received data are first synchronized in a step 2.1. If the coder has inserted cyclic prefixes, they are removed in a step 2.2. Then, a fast Fourier transform 2.3 is applied to transform the signal in the frequency domain. Then, an equalization step 2.4 occurs using data relative to the channel conditions obtained by a step of channel estimation 2.7. Data are then despread by an inverse fast Fourier transform 2.5 before the demodulation and channel decoding step 2.6.

This system has good properties, in particular the transmitted signals keep envelope characteristics with a low PAPR (Peak to Average Power Ratio) similar to a single carrier system. This DFT spread OFDM is also called SC-FDMA for Single Carrier Frequency Division Multiple Access.

The receiver is simple to implement with a MMSE (Minimum Mean Square Error) linear equalizer in the frequency domain especially when cyclic prefixes are inserted in the signal.

It is known that the use of several antennas, at the emitter, leading to MISO system, or both at the emitter and the receiver, leading to MIMO systems allows the improvement of the robustness of the transmission. This improved robustness can be used to increase the range or the bandwidth by adjusting the classical range versus bandwidth tradeoff. Several diversity schemes could be used to take advantage of multiple antennas at the emitter.

Alamouti has developed a code which is a Space Time Block Code (STBC), because information to be transmitted are spread in space, by the different antennas, and in time, using different time slots. The reference paper regarding Alamouti codes is "A simple transmit diversity technique for wireless communications", *IEEE J. Select. Areas Commun.*, vol. 16, pp. 1451-1458, October 1998.

For two transmit antennas, Alamouti gave a simple orthogonal space-time block code (OSTBC) with full diversity and rate 1, meaning that it provides the same rate that the one attained by a single transmit antenna system, which is half of the maximum attainable data rate with a two antennas system. This code is described by:

$$A'_{12} = \begin{pmatrix} a_1 & a_2 \\ -a_2^* & a_1^* \end{pmatrix} \begin{matrix} \leftarrow \text{Time } t_1 \\ \leftarrow \text{Time } t_2 \end{matrix} \quad (1)$$

$$\text{Antenna } Tx1 \; Tx2$$

Equivalent versions are given by:

$$A''_{12} = \begin{pmatrix} a_1 & a_2 \\ a_2^* & -a_1^* \end{pmatrix}, A^{(I)}_{12} = \begin{pmatrix} a_1 & -a_2^* \\ a_2 & a_1^* \end{pmatrix}, A^{(II)}_{12} = \begin{pmatrix} a_1 & a_2^* \\ a_2 & -a_1^* \end{pmatrix}. \quad (2)$$

Other code matrices can be obtained by operations of transposition, sign changes or complex conjugate applied on the codes given above. The optimal (ML) decoding is very simple (no matrix inversion) as long as the channel does not vary between $t_1$ and $t_2$, and as long as the channel can be characterized by a simple multiplication.

It has been proven that complex orthogonal designs with full diversity and transmission rate 1 are not possible for more than 2 transmit antennas. Extended Alamouti schemes for more than 2 antennas, resulting in quasi-orthogonal (QO) designs, have already been introduced by Jafarkhani and others. References can be found in <<H. Jafarkhani, "A Quasi-Orthogonal Space-Time block Code", *IEEE Transactions on Communications*, January 2001>>, <21 C. Papadias, G. Foschini, "A space-time coding approach for systems employing four transmit antennas", IEEE ICASSP 2001>> and <<M. Rupp, C. F. Mecklenbräuker, "On extended Alamouti Schemes for Space-Time Coding", *WPMC '02* Honolulu, Hi., October 2002>>. These codes can be expressed as:

$$A = \begin{pmatrix} A'_{12} & A'_{34} \\ A'_{34} & A'_{12} \end{pmatrix}, A' = \begin{pmatrix} A'_{12} & A'_{34} \\ -A^*_{34} & A^*_{12} \end{pmatrix}, A'' = \begin{pmatrix} A'_{12} & A'_{34} \\ A^*_{34} & -A^*_{12} \end{pmatrix} \quad (3)$$

"Quasi-orthogonality" means that most of the columns of A are orthogonal each other. The quasi-orthogonality permits simplified ML decoding. MMSE and ZF classical decoders also give good performance. At the expense of some diversity loss, the Jafarkhani codes keep the data transmission rate 1 which is ¼ of the maximum transmission rate with four antennas. All the above schemes (1-3) are naturally well combined with OFDM or OFDM-like modulation schemes.

The issue is to design a space-time or space-frequency code for 4 transmit antennas that will keep the low-PAPR property at each transmit antenna when associated with DFT spread OFDM. An easy decoding relies on frequency-domain implementation at the receiver. For this reason, we give a simple characterisation of the scheme in the frequency domain at the transmitter, even if an equivalent implementation can also be performed in the time domain.

Jafarkhani proposed to implement its QOSTBC schemes in the time dimension: the scheme precodes symbols to be transmitted on the same frequency (subcarrier) but on 4 different time slots (i.e. 4 successive OFDM-type symbols). However, using 4 time slots may be annoying, especially in 3GPP/LTE context: in TDD mode, the frame length is variable, and imposing that it must contain a multiple-of-4 number of slots is a hard constraint. Moreover, for all systems, the granularity is multiplied by 4 if 4 slots are always to be combined.

Another possibility is to combine the scheme in the frequency domain (which is called in this case QOSFBC for Quasi Orthogonal Space Frequency Block Code) with SC-FDMA. It could be implemented on 4 adjacent sub-carriers of the same OFDM-type symbol. However, in this case, the signal transmitted on antennas 2, 3 and 4 do not keep the envelope characteristics of a single carrier (SC) signal anymore, because of the performed frequency manipulations.

To answer this issue, the invention proposes a SC-QOSFBC (standing for Single Carrier—Quasi Orthogonal Space Frequency Block Code) for 4 transmit antennas based on sending an equivalent constellation on the other antennas. This can be formalized using a parametrized transform applied to the signal of the first antenna to give the signal sent on the three other antennas.

In most embodiments of the invention, we get the advantage of keeping the low-PAPR property with a single carrier quasi orthogonal space frequency block code.

The invention concerns a method of radio data emission, by an emitter comprising at least four transmit antennas, the signal to be transmitted on a first antenna being considered in the frequency domain as resulting from a DFT of size M leading to the emission of a symbol on each of the M sub carriers on this first antenna, the SC(p) relation being defined by $S_k^{Ts} = (-1)^{k+1} S^*_{(p-1-k) \mod M}$, for k=0 to M−1 giving the signal to be emitted on a second antenna Ts from the signal S to be emitted on a first antenna, where p is a parameter between 0 and M−1 and k the index for each sub carrier in the frequency domain, each group of four antennas defining two pairs of antennas, comprising the step of emitting on each antenna a signal such that:

for each group of four antennas, any incomplete group comprising from one to three antennas being treated as a complete group in which some antennas are suppressed afterward:
the signals emitted on the antennas of each pair are related by the SC(p) relation;
the signal emitted on one of the antennas of the first pair and the signal emitted on one of the antennas of the second pair is related by a second relation that keeps the single carrier property;
the signal emitted on one of the antennas of a first group of four antennas and the signal emitted on one antenna of another group is related by a third relation that keeps the single carrier property.

According to a particular embodiment, the second relation is the relation Shift(p) defined by $S_k^{Tr} = S_{(k-p) \mod M}$ for k=0 to M−1.

According to a particular embodiment p=M/2.

According to a particular embodiment, the second relation is the relation Flip(p) defined by $S_k^{Tr} = S_{(M-1-k+p) \mod M}$ for k=0 to M−1.

According to a particular embodiment, the second relation is the relation Altconj defined by $S_k^{Tr} = (-1)^k S^*_k$ for k=0 to M−1.

According to a particular embodiment, the second relation is the conjugate.

According to a particular embodiment, the second relation is the identity.

According to a particular embodiment, the third relation is the Shift relation.

According to a particular embodiment, the second relation is applied to symbols of the same time slot.

According to a particular embodiment, the second relation is applied to symbols of different time slots.

According to a particular embodiment, the second relation is applied to symbols of consecutive time slots.

According to a particular embodiment, a time shift operation is introduced on each transmit antenna, the shifting value $L_i$ applied to each antenna being lower than the size N of the coding sequence, the shifting values $L_i$ applied to antennas not being all equal, the shifting value $L_i$ applied to each antenna being applied modulo N.

According to a particular embodiment, a time delay operation is introduced on each transmit antenna, the delay values $L_i$ applied to antennas not being all equal.

The invention also concerns a radio data emitter comprising at least four transmit antennas comprising means to transmit signals according to one of the above methods.

The invention also concerns a radio data receiver comprising means to decode signals transmitted according to one of the above methods.

The characteristics of the invention will emerge more clearly from a reading of the following description of an example embodiment, the said description being produced with reference to the accompanying drawings, among which:

FIG. 9 represents a table of the relations between the 8 antennas of a SC-QOSFBC scheme.

A SFBC compatible with SC-FDMA with two transmit antennas, that we will call SC-OSFBC for Single Carrier—Orthogonal Space Frequency Block Code, has been introduced in <<C. Ciochina, D. Castelain, D. Mottier and H. Sari, "A Novel Space-Frequency Coding Scheme for Single-Carrier Modulations," 18$^{th}$ Annual IEEE International Symposium on Personal, Indoor and Mobile Communications (PIMRC'07), Athens, Greece, September 2007 >> and in <<C. Ciochina, D. Castelain, D. Mottier and H. Sari, "Single-Carrier Space-Frequency Block Coding: Performance Evaluation," IEEE 66$^{th}$ Vehicular Technologies Conference (VTC 2007 Fall), Baltimore, USA, September 29-Oct. 3, 2007>>. These codes are also described in European patent application 07 003191 from the same applicant which priority is claimed. For the frequency-domain implementation, SC-OSFBC consists in the following steps:

Form pairs $(k_1, k_2)$, $k_1, k_2 \in \{0, 1, \ldots M-1\}$ with $k_2=(p-1-k_1)$ mod M, where p is an even integer and M stands for the size of the DFT.

Choose $a_1=s_{k_1}$, $a_2=s_{k_2}$ (where $s_{0 \ldots M-1}$ are the M outputs of the DFT, to be mapped on the first transmit antenna) and perform OSFBC coding considering alternatively the coding matrices $A_{12}^{(I)}$ and $A_{12}^{(II)}$ This results in:

$$s_k^{Tx2}=(-1)^{k+1}s^*_{(p-1-k) \bmod M}, (k=0 \ldots M-1) \quad (4)$$

Figure 1:
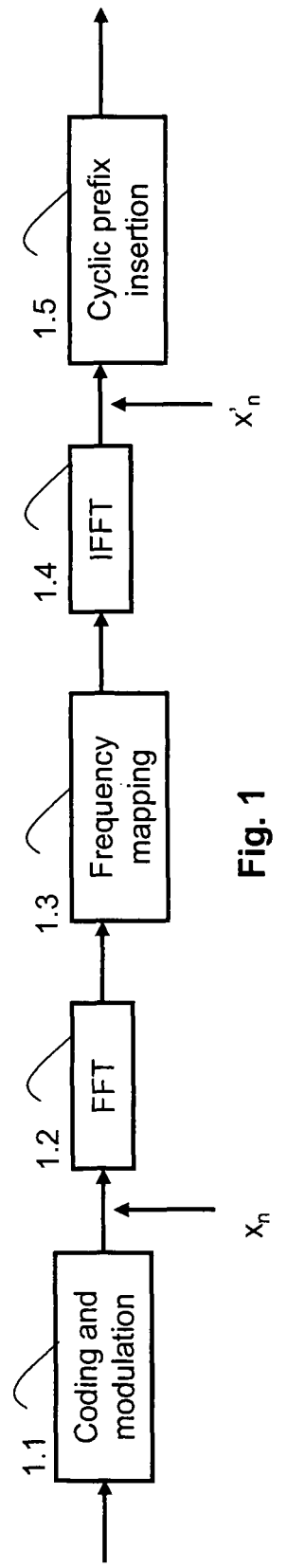
FIG. 1 represents a frequency implementation of the transmitter part in a SC-FDMA system.
Figure 2:
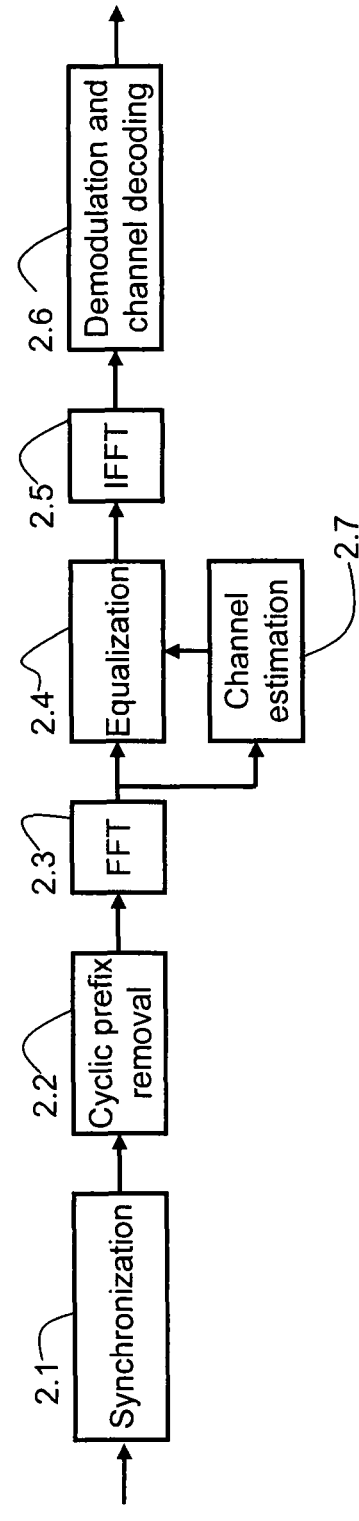
FIG. 2 represents a frequency implementation of the receiver part in a SC-FDMA system.
Figure 3:
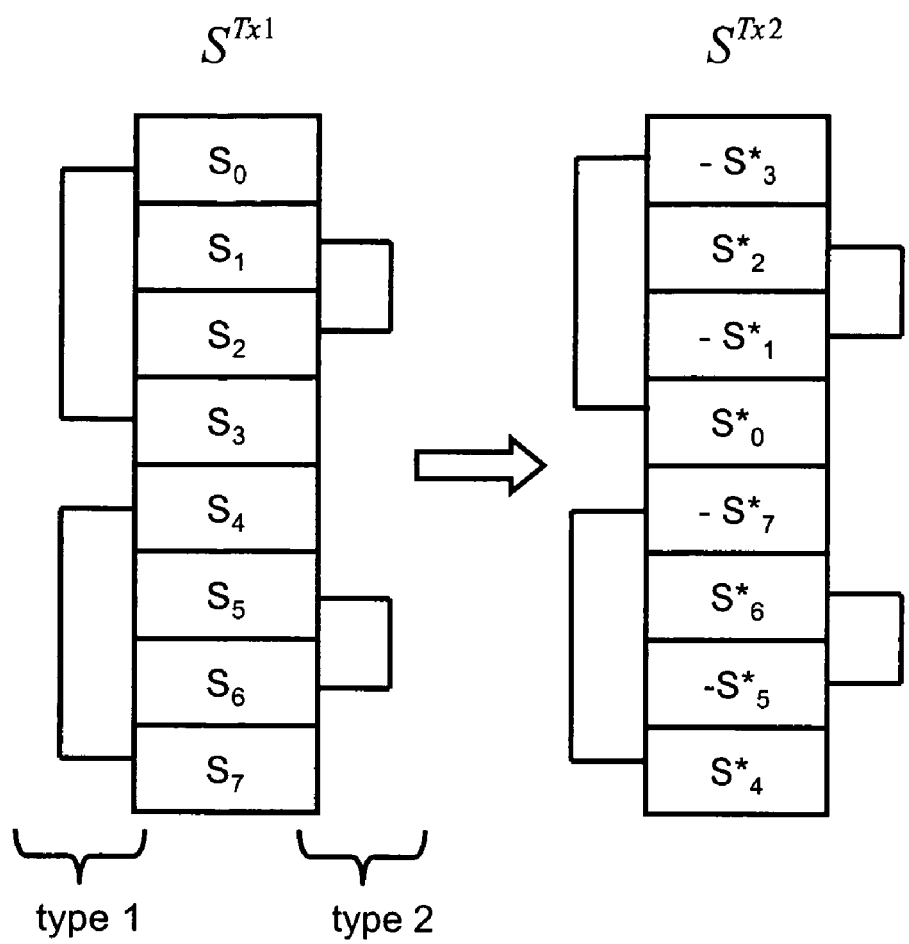
FIG. 3 represents an example of SC-OSFBC mapping for M=8, p=4.

An example of this type of mapping is given FIG. 3. This figure illustrates for M=8 the symbols emitted on the sub carriers of antenna Tx1. The sub carriers are paired as illustrated. On some pairs, the one illustrated on the left of the array for example, a first type of coding is applied, namely the coding matrix $A_{12}^{(I)}$, on some other pairs, the one illustrated by the link on the right of the array, a second type of coding is applied, namely the coding matrix $A_{12}^{(II)}$. The choice of the coding matrix depends on the parity of $k_1$. The coding results in the symbols as illustrated for antenna Tx2.

Alternative equivalent schemes also exist. Note that the distance between the subcarriers involved in the coding is fixed by the parameter p. In order to minimize the maximum distance between $(k_1, k_2)$, one should choose p=M/2 for these two antennas case. Other choices of p (even) also lead to valid SC-OSFBC mappings.

Time domain implementation is also possible. If we denote by $x_n$, n=0 ... M-1, the modulation symbols prior to SC-FDMA/OFDMA-like modulation, the time domain implementation will consist in sending on the second antenna an equivalent constellation:

$$x_n^{equiv,Tx2}\big|_{SC-SFBC} = e^{j2\pi\frac{(p-1)n}{M}} x^*_{(n+M/2) \bmod M} \quad (n = 0 \ldots M-1) \quad (5)$$

Figure 4:
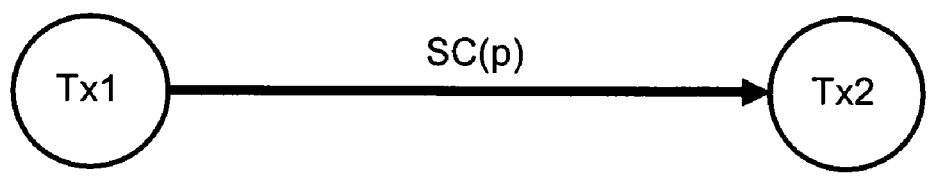
FIG. 4 represents an illustration of the SC-OSFBC mapping.

The advantage of this type of mapping, which we will denote in the following SC(p), is that it keeps the SC property of the signal on both transmit antennas, and it also benefits from the flexibility of SFBC, meaning that only one OFDM time slot is involved in the coding scheme. In the rest of the document, this relationship will be illustrated as in FIG. 4. This figure illustrates that the symbols emitted on antenna Tx2 are the results of the function SC(p) applied to symbols emitted on antenna Tx1. The inverse relation is denoted −SC(p).

The issue is to design a space-time or space-frequency code for 4 transmit antennas, easy to code and to decode, that will keep the low-PAPR property at each transmit antenna. An easy decoding relies on frequency-domain implementation at the receiver.

In order to address this issue, we build two different versions of the QO Jafarkhani code as given below:

$$A^{(I)} = \begin{pmatrix} A_{12}^{(I)} & A_{43}^{(I)} \\ A_{34}^{(II)} & A_{21}^{(II)} \end{pmatrix} = \begin{pmatrix} a_1 & -a_2^* & a_4 & -a_3^* \\ a_2 & a_1^* & a_3 & a_4^* \\ a_3 & a_4^* & a_2 & a_1^* \\ a_4 & -a_3^* & a_1 & -a_2^* \end{pmatrix} \quad (6)$$

$$A^{(II)} = \begin{pmatrix} A_{12}^{(II)} & A_{43}^{(II)} \\ A_{34}^{(I)} & A_{21}^{(I)} \end{pmatrix} = \begin{pmatrix} a_1 & a_2^* & a_4 & a_3^* \\ a_2 & -a_1^* & a_3 & -a_4^* \\ a_3 & -a_4^* & a_2 & -a_1^* \\ a_4 & a_3^* & a_1 & a_2^* \end{pmatrix} \quad (7)$$

Then we form groups $(k_1, k_2, k_3, k_4)$, $k_1, k_2, k_3, k_4 \in \{0, 1, \ldots, M-1\}$ with:

$$\begin{cases} k_2 = (p - 1 - k_1) \bmod M \\ k_3 = (p - M/2 - 1 - k_1) \bmod M \\ k_4 = (k_1 - M/2) \bmod M \end{cases} \quad (8)$$

where M stands for the size of the DFT precoder and p is an even integer.

We choose:

$$a_i=s_{k_i}, i=1 \ldots 4; \quad (9)$$

(where $s_{0 \ldots M-1}$ are the M outputs of the DFT at a considered time instant) and perform QOSFBC coding considering the coding matrices $A^{(I)}$ for $k_1$ even and $A^{(II)}$ for $k_1$ odd.

This results in the following relationships between the frequency samples on the 4 antennas:

$$\begin{cases} s_k^{Tx1} = s_k \\ s_k^{Tx2} = (-1)^{k+1} s^*_{(p-1-k) \bmod M} \\ s_k^{Tx3} = s_{(k-M/2) \bmod M} \\ s_k^{Tx4} = (-1)^{k+1} s^*_{(p-M/2-1-k) \bmod M}, \end{cases} \quad (10)$$

$(k = 0 \ldots M - 1),$

Figure 5:
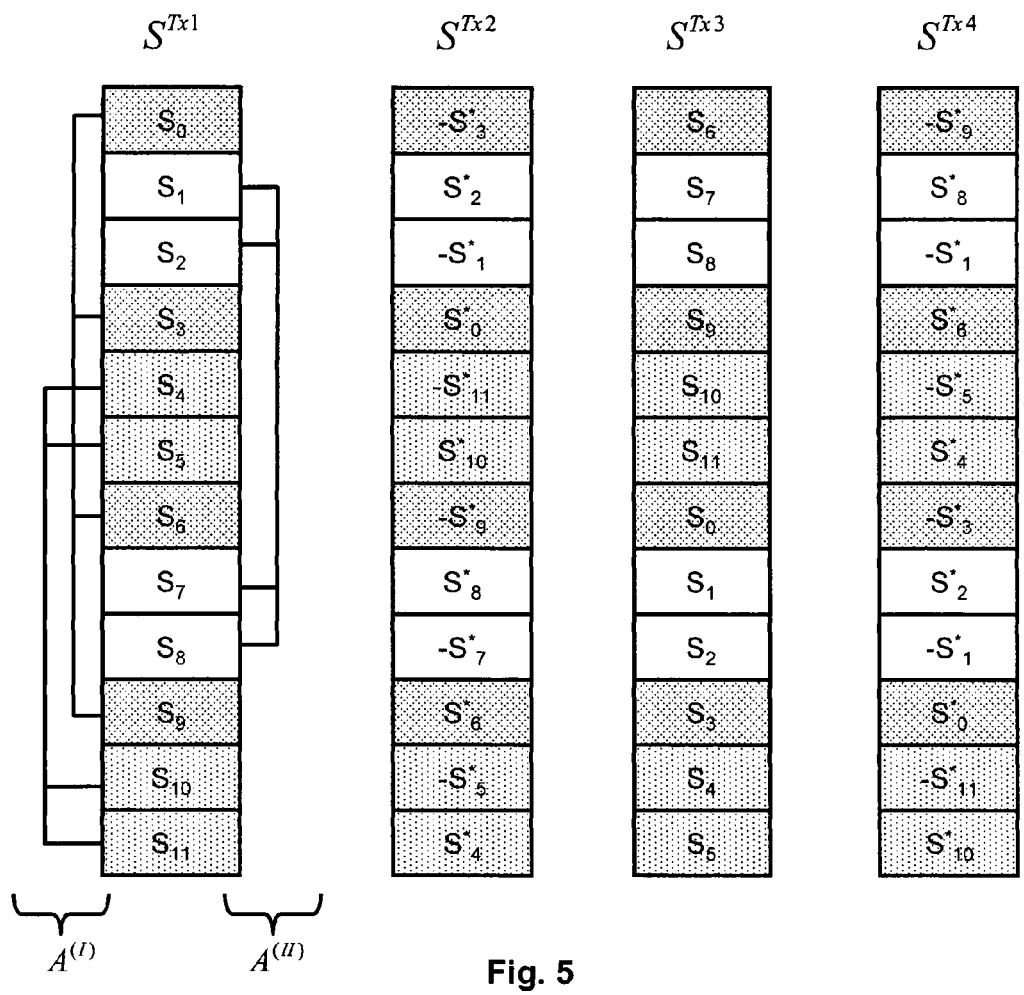
FIG. 5 represents an example of SC-QOSFBC mapping for M=12, p=4.
Figure 6:
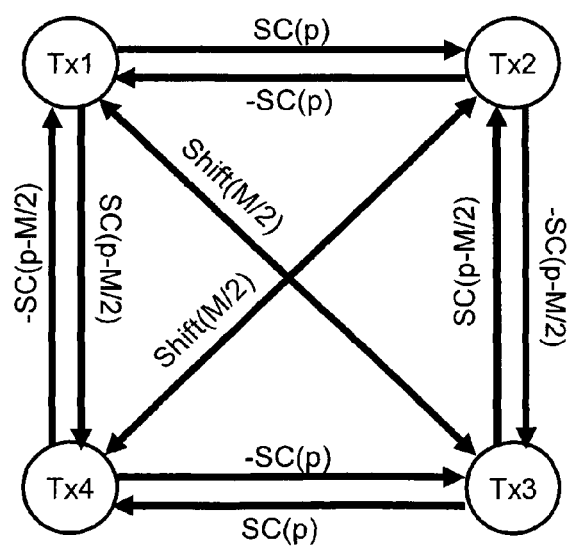
FIG. 6 represents an illustration of the SC-QOSFBC coding representation.
Figure 7:
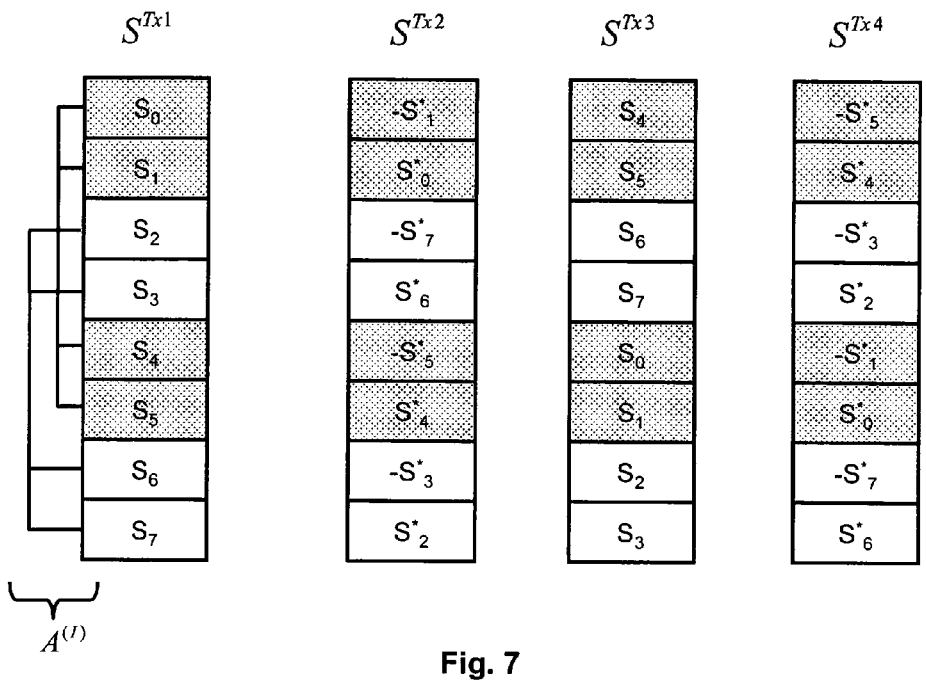
FIG. 7 represents an example of SC-QOSFBC mapping for M=8, p=2.

These relationships lead to the representations in FIG. 5 and FIG. 6. FIG. 5 is an example of SC-QOSFBC mapping for M=12, p=4, $(k_1, k_2, k_3, k_4)=\{(0, 3, 9, 6), (1, 2, 8, 7), (4, 11, 5, 10)\}$. FIG. 6 is a relational representation of the same code, where SC is the relation defined above, −SC its inverse relation and shift the relation where the result is the same symbols shifted of the parameter value. The shift is made on indexes modulo M. FIG. 7 is another example of SC-QOSFBC for M=8, p=2; $(k_1, k_2, k_3, k_4)=\{(0, 1, 5, 4), (2, 7, 3, 6)\}$.

It is to be noted that for some values of M and p, for example for M=8 and p=2 as illustrated FIG. 7, $k_1$ is always even and we only use $A^{(I)}$.

Time domain implementation is also possible. If we denote by $x_n$, n=0 . . . M−1, the modulation symbols prior to SC-FDMA/OFDMA-like modulation (which will be sent after SC-FDMA/OFDMA-like modulation on Tx1), the time domain implementation will consist in sending on Tx2, Tx3, and Tx4 the equivalent constellations corresponding to the frequency representation (10):

$$\begin{cases} x_n^{equiv,Tx2}|_{SC-QOSFBC} = e^{j2\pi\frac{(p-1)n}{M}} x^*_{(n+M/2) \bmod M} \\ x_n^{equiv,Tx3}|_{SC-QOSFBC} = (-1)^n x_n \\ x_n^{equiv,Tx2}|_{SC-QOSFBC} = e^{j2\pi\frac{(p-M/2-1)n}{M}} x^*_{(n+M/2) \bmod M} \end{cases} \quad (11)$$

$$n = 0 \ldots M - 1$$

This type of mapping keeps the SC property of the signal on all transmit antennas, and it also benefits from the flexibility of QOSFBC.

The solution is applicable for all M that are a multiple of 4. The distance between the sub-carriers involved in the coding is fixed by the parameter p. In order to minimize the maximum distance between $(k_1, k_2, k_3, k_4)$, one should choose p as the closest even integer to M/4 (it would correspond to a maximal distance of 3M/4). Other choices of p (even) also lead to valid SC-QOSFBC mappings. Since the associated symbols can be largely separated in frequency, and that these frequencies will correspond to different channel responses, this leads to a slight degradation of performance. The corresponding increase of complexity at the decoder is negligible. Moreover, in the application foreseen first (3GPP/LTE), the receiver will be implemented in the base station.

Equivalent coding schemes could be exhibited. They all have the same properties, in particular they all keep a low PAPR. As an example, let us replace the pair of coding matrices (6)-(7) with:

$$A'^{(I)} = \begin{pmatrix} A_{12}^{(I)} & A_{43}^{(I)*} \\ A_{34}^{(II)} & A_{21}^{(II)*} \end{pmatrix} = \begin{pmatrix} a_1 & -a_2^* & a_4^* & -a_3 \\ a_2 & a_1^* & a_3^* & a_4 \\ a_3 & a_4^* & a_2^* & a_1 \\ a_4 & -a_3^* & a_1^* & -a_2 \end{pmatrix}, \quad (12)$$

$$A'^{(II)} = \begin{pmatrix} A_{12}^{(II)} & A_{43}^{(II)*} \\ A_{34}^{(I)} & A_{21}^{(I)*} \end{pmatrix} = \begin{pmatrix} a_1 & a_2^* & a_4^* & a_3 \\ a_2 & -a_1^* & a_3^* & -a_4 \\ a_3 & -a_4^* & a_2^* & -a_1 \\ a_4 & a_3^* & a_1^* & a_2 \end{pmatrix}. \quad (13)$$

Together with (8), this results in the following coding scheme:

$$\begin{cases} s_k^{Tx2} = (-1)^{k+1} s^*_{(p-1-k) \bmod M} \\ s_k^{Tx3} = s^*_{(k-M/2) \bmod M} \\ s_k^{Tx4} = (-1)^{k+1} s_{(p-M/2-1-k) \bmod M} \end{cases}, (k = 0 \ldots M-1). \quad (14)$$

Other equivalent straightforward schemes exist, e.g.: exchanging between antenna signals, inverting some antenna signals, taking the conjugate and/or minus of all or some of the signals, taking shifted versions of the signals etc. . . .

It is also possible to have different descriptions, e.g. equations, resulting actually in exactly the same mapping.

Let us for example consider that we apply the coding matrices:

$$A''^{(I)} = \begin{pmatrix} A_{12}^{(I)} & A_{34}^{(I)} \\ A_{34}^{(I)} & A_{12}^{(I)} \end{pmatrix} = \begin{pmatrix} a_1 & -a_2^* & a_3 & -a_4^* \\ a_2 & a_1^* & a_4 & a_3^* \\ a_3 & -a_4^* & a_1 & -a_2^* \\ a_4 & a_3^* & a_2 & a_1^* \end{pmatrix}, \quad (15)$$

$$A''^{(II)} = \begin{pmatrix} A_{12}^{(II)} & A_{34}^{(II)} \\ A_{34}^{(II)} & A_{12}^{(II)} \end{pmatrix} = \begin{pmatrix} a_1 & a_2^* & a_3 & a_4^* \\ a_2 & -a_1^* & a_4 & -a_3^* \\ a_3 & a_4^* & a_1 & a_2^* \\ a_4 & -a_3^* & a_2 & -a_1^* \end{pmatrix}, \quad (16)$$

but considering groups $(k_1, k_2, k_3, k_4)$ where we have switched the order of $k_3$ and $k_4$:

$$\begin{cases} k_2 = (p-1-k_1) \bmod M \\ k_3 = (k_1 - M/2) \bmod M \\ k_4 = (p - M/2 - 1 - k_1) \bmod M. \end{cases} \quad (17)$$

This will result in exactly the same mapping as (10).

Other equivalent descriptions:

We switch between $k_3$, $k_4$ when $k_1$ is even and between $k_1$, $k_2$ otherwise and always use $A''^{(I)}$ (e.g., in FIG. 5 we consider $(k_1, k_2, k_3, k_4)=\{(0, 3, 6, 9), (2, 1, 8, 7), (4, 11, 10, 5)\}$)

We switch between $k_3$, $k_4$ when $k_1$ is odd and between $k_1$, $k_2$ otherwise and always use $A''^{(II)}$ (e.g., in FIG. 5 we consider $(k_1, k_2, k_3, k_4)=\{(3, 0, 9, 6), (1, 2, 7, 8), (11, 4, 5, 10)\}$)

Such equivalent descriptions can be conceived for the mapping described by (14).

The scheme can be generalised to higher dimensions. As an example, for a eight-antenna system, it is possible to apply the 4-antenna scheme to antennas one to four, the same scheme to antennas five to eight, in such a way that the signal transmitted by the fifth antenna (or any other antenna in the second group) is (in the frequency domain) a shifted version of the signal transmitted by the first antenna (or any other antenna in the first group), the shift being equal to M/4. This is illustrated in FIG. 8.

It is clear that it is possible to replace, for each 4-antennas group, the coding scheme by an equivalent coding scheme as described in the above paragraphs. From FIG. 8, it is also easy to define a coding scheme of dimensions 5 to 7, by simply suppressing some of the eight antennas. Generalization to dimension higher than eight is straightforward. For example, a 16-dimension scheme can be defined, by using two 8-dimension codes for two groups of 8 antennas, and by defining the signal of one of the antenna of the second group as a shifted version (shift M/8 in this case) of the signal of one of the antenna of the first group. Again, a code of dimension 9 to 15 will be defined by suppressing some of the antennas of the 16-dimension scheme.

Figure 8:
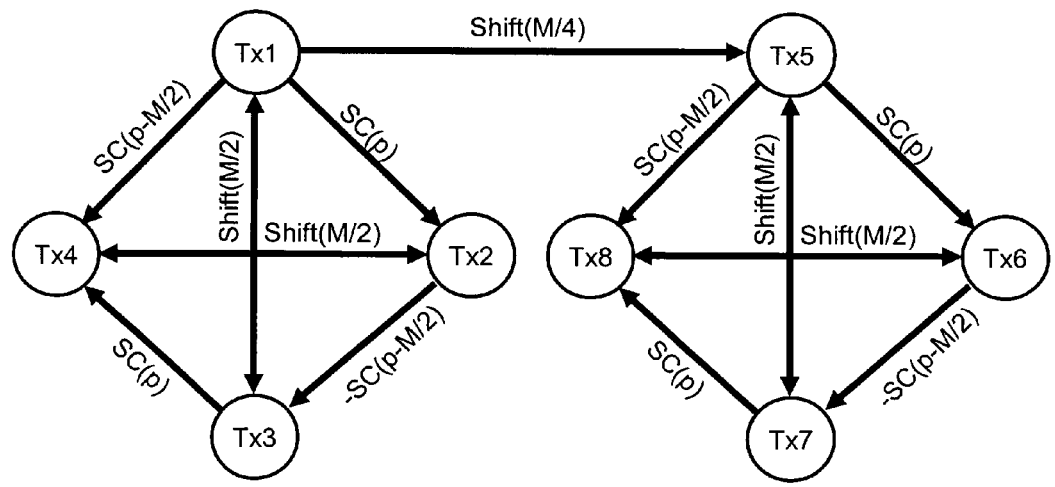
FIG. 8 represents an example of SC-QOSFBC 8 antennas coding representation.

Concerning the 8-dimension scheme of FIG. 8, the orthogonality between the signals of some of the antennas is proved in table of FIG. 9. The signals related by an SC(x) relationship are orthogonal. This 8-antenna scheme is not only quasi-orthogonal (i.e. orthogonal for some of the dimensions) with SC envelope characteristics, it also allows a decoding by groups of eight carriers in the frequency domain. The eight carriers corresponding to such a group are:

$$\begin{cases} k_1 \\ k_2 = (p-1-k_1) \bmod M \\ k_3 = (k_1 - M/2) \bmod M \\ k_4 = (p-1-k_1 + M/2) \bmod M \\ k_5 = (k_1 + M/4) \bmod M \\ k_6 = (p-1-k_1 + M/4) \bmod M \\ k_7 = (k_1 - M/4) \bmod M \\ k_8 = (p-1-k_1 - M/4) \bmod M \end{cases} \quad (18)$$

It is worth mentioning that the way to obtain a number of antennas different from a power of two can be applied to the original scheme with 4 antennas. It allows obtaining an original system with 3 antennas. On the other hand, if we apply this method to obtain a two-antenna scheme, it will result in the SC(p) scheme already patented in European patent application 07 003191.

The first proposed scheme, described above, is a pure frequency coding, using one OFDM symbol at a time, resulting in applying the scheme to symbols of the same time slot, while the classical STBC scheme would use four OFDM symbols at a time. Besides these schemes, it is possible to define a time and frequency scheme, which will be denoted in the following QOSTFBC (Quasi Orthogonal Space Time and Frequency Block Coding). This scheme will use two frequencies and two time slots (i.e. two OFDM symbols) at a time. However, using two adjacent frequencies will not respect the SC nature of the signals, as it is the case for the two antenna case as described in European patent applications 07 003191 and 07 006681.

A proposed SC-QOSTFBC code will be described as following:

Let us change the signification of the equations (6) and (7) so as to correspond to the following QOSTFBC code:

$$\begin{array}{cccc} Tx1 & Tx2 & Tx3 & Tx4 \\ \downarrow & \downarrow & \downarrow & \downarrow \end{array} \quad (19)$$

$$A^{(I)} = \begin{pmatrix} A_{12}^{(I)} & A_{43}^{(I)} \\ A_{34}^{(II)} & A_{21}^{(II)} \end{pmatrix} = \begin{pmatrix} a_1 & -a_2^* & a_4 & -a_3^* \\ a_2 & a_1^* & a_3 & a_4^* \\ a_3 & a_4^* & a_2 & a_1^* \\ a_4 & -a_3^* & a_1 & -a_2^* \end{pmatrix} \begin{array}{l} \to f_{k_1} \\ \to f_{k_2} \\ \to f_{k_1} \\ \to f_{k_2} \end{array} \bigg\} t_1,$$

$$\begin{array}{cccc} Tx1 & Tx2 & Tx3 & Tx4 \\ \downarrow & \downarrow & \downarrow & \downarrow \end{array}$$

-continued $$A^{(II)} = \begin{pmatrix} A_{12}^{(II)} & A_{43}^{(II)} \\ A_{34}^{(I)} & A_{21}^{(I)} \end{pmatrix} = \begin{pmatrix} a_1 & a_2^* & a_4 & a_3^* \\ a_2 & -a_1^* & a_3 & -a_4^* \\ a_3 & -a_4^* & a_2 & -a_1^* \\ a_4 & a_3^* & a_1 & a_2^* \end{pmatrix} \begin{array}{l} \to f_{k_1} \\ \to f_{k_2} \\ \to f_{k_1} \\ \to f_{k_2} \end{array} \bigg\} t_2. \quad (20)$$

Form pairs $(k_1, k_2)$, $k_1, k_2 \in \{0, 1, \ldots M-1\}$ with $k_2 = (p-1-k_1) \bmod M$ where p is an even integer and M stands for the size of the DFT.

We choose $$a_1 = s_{k_1}^{t_1}, a_2 = s_{k_2}^{t_1} a_3 = s_{k_1}^{t_2} \text{ and } a_4 = s_{k_2}^{t_2}, \quad (21)$$

where $s^{t_1}$, $s^{t_2}$ are the M-sized vectors at the output of the DFT at time instants $t_1$, $t_2$ and perform QOSTFBC coding considering the coding matrix $A^{(I)}$ when $k_1$ is even and $A^{(II)}$ when $k_1$ is odd. Classically, but not mandatory, the two time instants $t_1$, $t_2$ are consecutive.

Let us denote by $\text{Flip}_p$ an operation, that applied to a M-sized vector s transforms it into a M-sized vector $s' = \text{Flip}_p(s)$ such that:

$$s_k' = s_{(M-1-k+p) \bmod M}, \quad (22)$$

which corresponds to inverting the order of the samples and then applying a circular shift of step p. Let us also define Altconj as complex conjugation and sign alternate operation that, applied to a M-sized vector s, would produce the M-sized vector $s' = \text{Altconj}(s)$ given by:

$$s_k' = (-1)^k s^*_k. \quad (23)$$

We notice that:

$$\text{Flip}_p \cdot \text{Altconj} = SC(p)$$

$$\text{Altconj} \cdot \text{Flip}_p = -SC(p) \quad (24)$$

Figure 10:
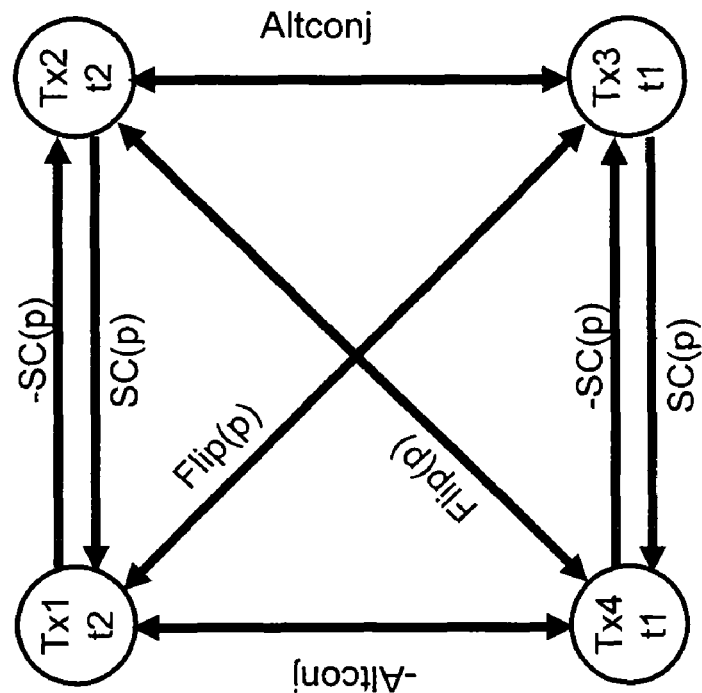
FIG. 10 represents an example of SC-QOSTFBC coding representation.
Figure 10:
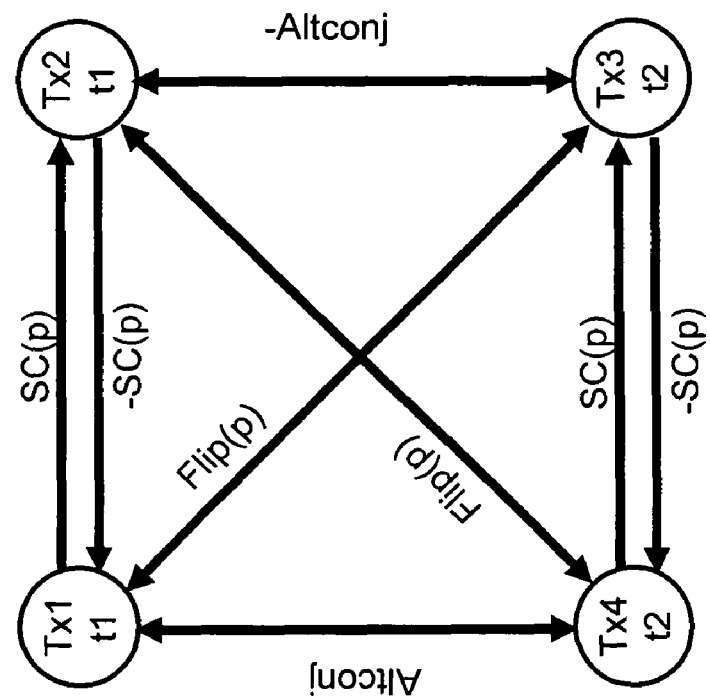

This results in the following relationships between the antennas represented on FIG. 10.

Figure 11:
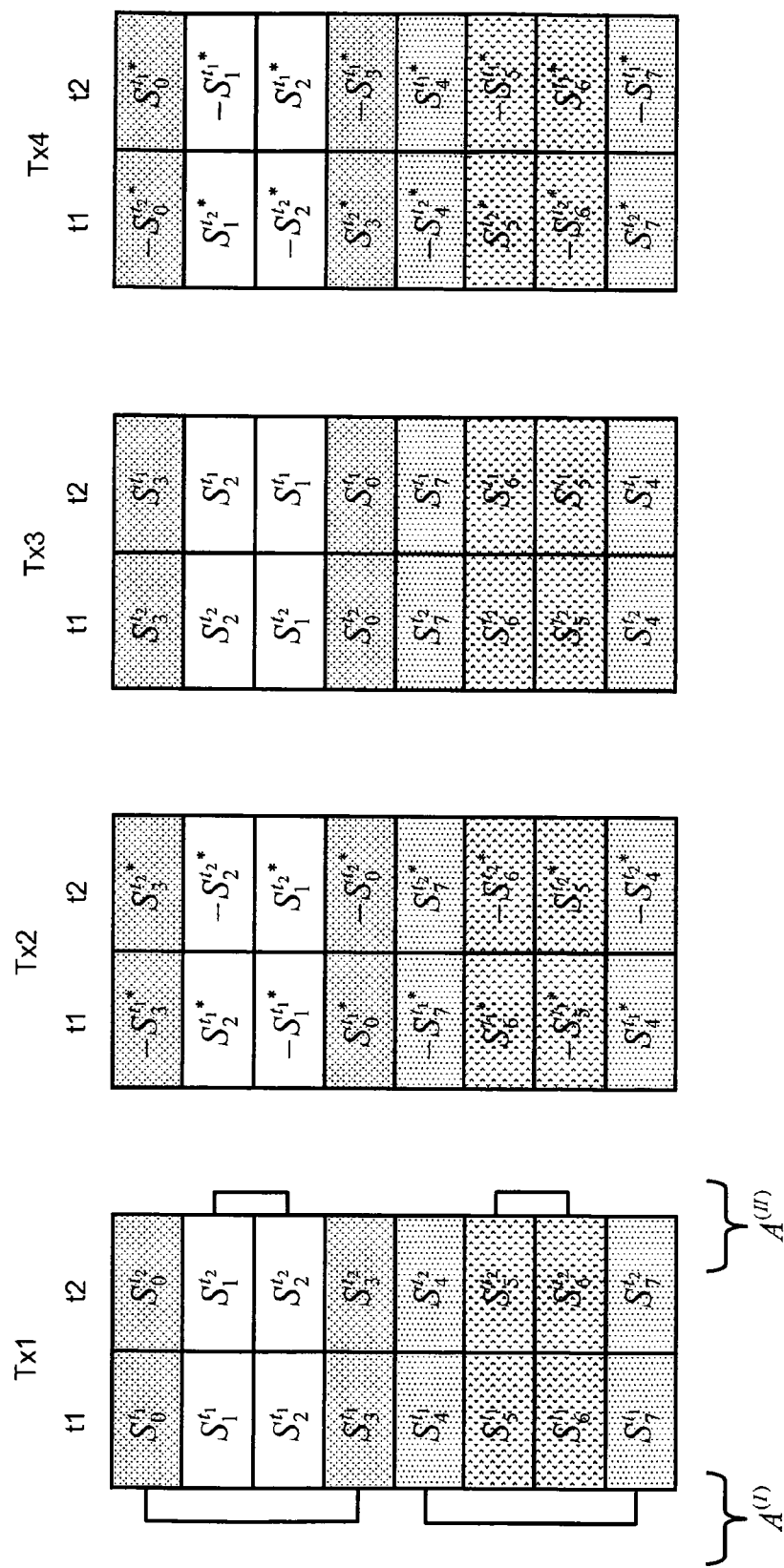
FIG. 11 represents an example of SC-QOSTFBC mapping for M=8, p=4.

The solution is applicable for all even M and for coded blocks that contain an even number of OFDMA-like symbols. The distance between the subcarriers involved in the coding is fixed by the parameter p. In order to minimize the maximum distance between $k_1$ and $k_2$, one should choose p=M/2. Other choices of p (even) also lead to valid SC-QOSTFBC mappings. An example for such mapping for M=8, p=4 is given FIG. 11.

Since the associated symbols can be largely separated in frequency, and that these frequencies will correspond to different channel responses, this leads to a slight degradation of performance. This solution keeps the rate of the transmission to 1 symbol per channel use. Any line/column permutation, complex conjugate or sign inversion performed on the matrices $A^{(I,II)}$, as well as inverting/switching the order of the antennas will result in equivalent codes.

Time domain implementation is also possible, by sending on the 4 transmit antennas the equivalent constellation points obtained by computing the inverse DFT of the corresponding vectors s.

It is also to be noted that it is possible to extend this scheme to other dimensions than eight, in the same way that what was done for the QO-SFBC scheme.

Different equivalent mappings are possible, with the same QO characteristics.

Figure 12:
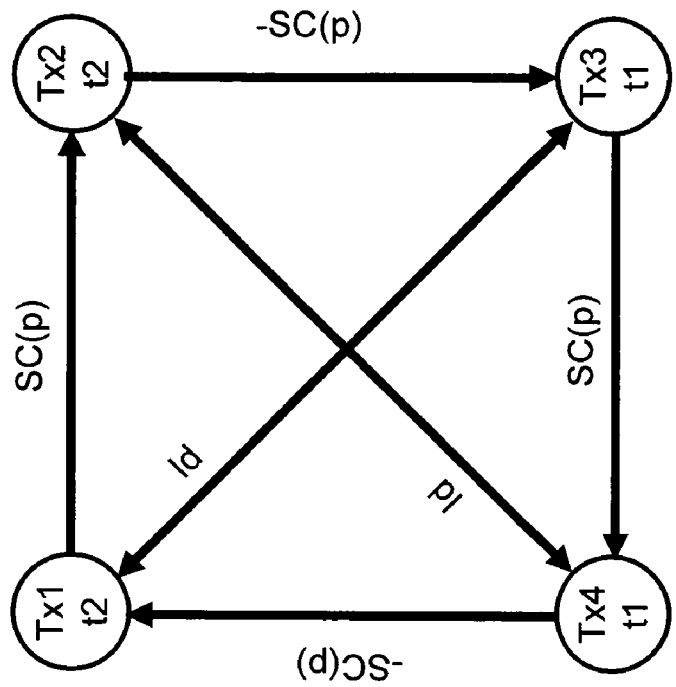
FIG. 12 represents a second example of SC-QOSTFBC coding representation.
Figure 12:
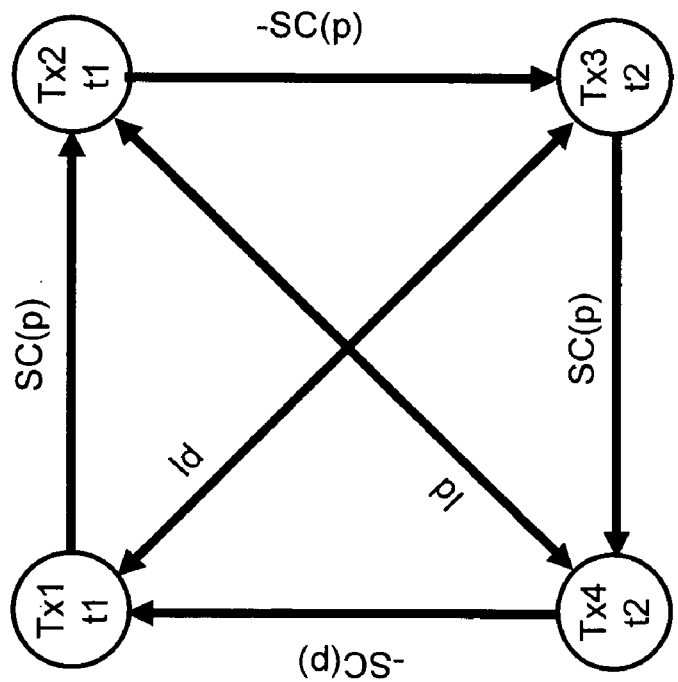

As an example a second possibility corresponds to the matrices:

$$A'''^{(I)} = \begin{pmatrix} A_{12}^{(I)} & A_{34}^{(I)} \\ A_{34}^{(I)} & A_{12}^{(I)} \end{pmatrix} = \begin{pmatrix} a_1 & -a_2^* & a_3 & -a_4^* \\ a_2 & a_1^* & a_4 & a_3^* \\ a_3 & -a_4^* & a_1 & -a_2^* \\ a_4 & a_3^* & a_2 & a_1^* \end{pmatrix} \quad (25)$$

$$A'''^{(II)} = \begin{pmatrix} A_{12}^{(II)} & A_{34}^{(II)} \\ A_{34}^{(II)} & A_{12}^{(II)} \end{pmatrix} = \begin{pmatrix} a_1 & a_2^* & a_3 & a_4^* \\ a_2 & -a_1^* & a_4 & -a_3^* \\ a_3 & a_4^* & a_1 & a_2^* \\ a_4 & -a_3^* & a_2 & -a_1^* \end{pmatrix} \quad (26)$$

with the same convention for $k_1$, $k_2$, $t_1$, $t_2$ as above. This second possibility corresponds to the representation given in FIG. 12 where Id represents the identity function.

A third possibility corresponds to the matrices:

$$A''''^{(I)} = \begin{pmatrix} A_{12}^{(I)} & -A_{34}^{(I)}{}^* \\ A_{34}^{(I)} & A_{12}^{(I)}{}^* \end{pmatrix} = \begin{pmatrix} a_1 & -a_2^* & -a_3^* & a_4 \\ a_2 & a_1^* & -a_4^* & -a_3 \\ a_3 & -a_4^* & a_1^* & -a_2 \\ a_4 & a_3^* & a_2^* & a_1 \end{pmatrix} \quad (27)$$

$$A''''^{(II)} = \begin{pmatrix} A_{12}^{(II)} & -A_{34}^{(II)}{}^* \\ A_{34}^{(II)} & A_{12}^{(II)}{}^* \end{pmatrix} = \begin{pmatrix} a_1 & a_2^* & -a_3^* & -a_4 \\ a_2 & -a_1^* & -a_4^* & a_3 \\ a_3 & a_4^* & a_1^* & a_2 \\ a_4 & -a_3^* & a_2^* & -a_1 \end{pmatrix} \quad (28)$$

Figure 13:
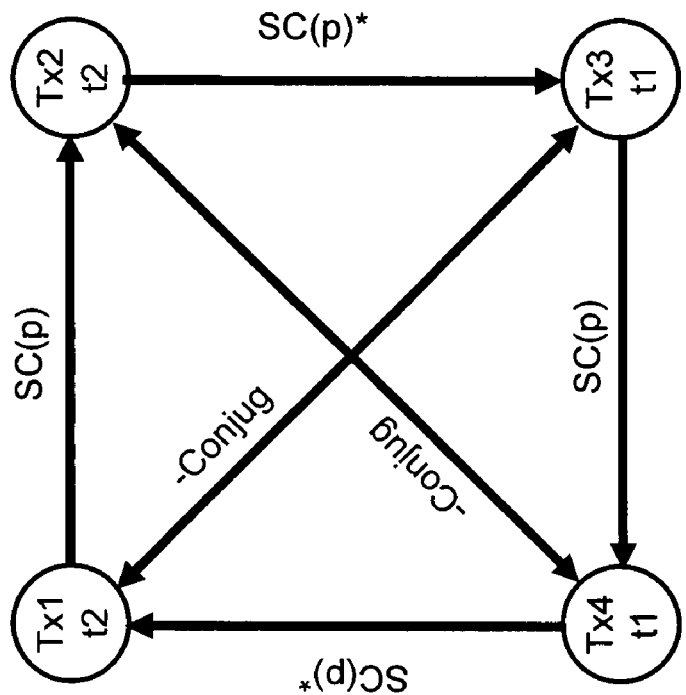
FIG. 13 represents a third example of SC-QOSTFBC coding representation.
Figure 13:
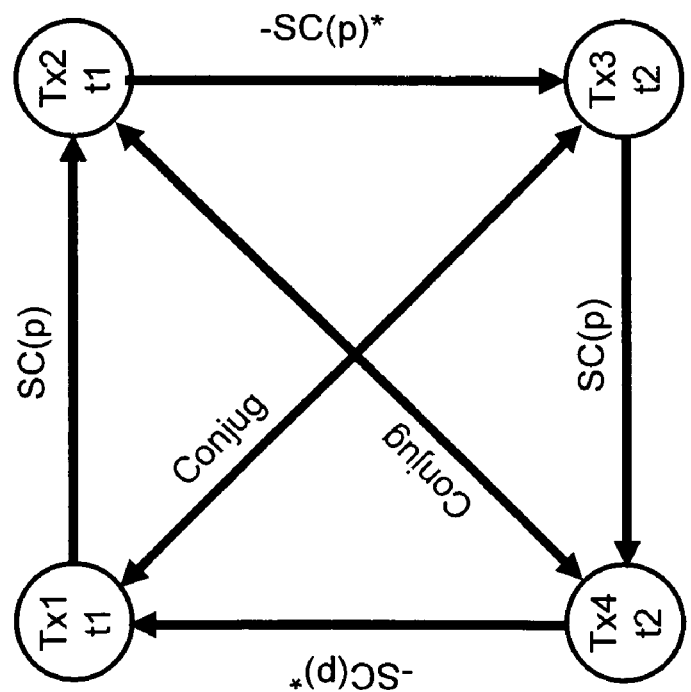

This third possibility corresponds to the representation given in FIG. 13. Though not evident from FIG. 13, there is orthogonality between first and third antennas, as it is made apparent in equations (27) and (28). In fact, there is orthogonality between TX1 ($t_1$ and $t_2$) and TX3 ($t_1$ and $t_2$).

All these equivalent coding schemes are such that a SC(p) scheme, or something directly equivalent, relates two pairs of antennas in a group of four antennas, whatever is the numbering of the antennas. Relating the two antennas of each pair of antenna in a group of four antennas by a relation based on a SC scheme, and relating two antennas, one in each different pairs, by a relation that keeps the single carrier property will ensure the result of defining a coding scheme with a low PAPR. Moreover this will also ensure a quasi orthogonal scheme with good performance. The relations keeping the single carrier property are numerous and well known. One can cite the identity, the shifting relation which consists of shifting the indices modulo M of the transmitted symbols, the Flip relation as defined by equation (22), the Altconj relation as defined by equation (23) and of course the SC function itself. These are only examples, other relations keeping the single carrier property could be used.

In another approach, let us suppose that we use only two transmit antennas, but that we can operate over two time intervals $t_1$ and $t_2$. Equations (10) and FIG. 6 still hold, but by replacing:

$$Tx1 \rightarrow Tx1(t_1)$$

$$Tx2 \rightarrow Tx2(t_1)$$

$$Tx3 \rightarrow Tx1(t_2)$$

$$Tx4 \rightarrow Tx2(t_2) \quad (29)$$

Any line/column permutation, complex conjugate or sign inversion performed on the matrices $A^{(I,II)}$, as well as inverting/switching the order of the antennas will result in equivalent codes. This code has half of the rate of the previous ones (½ symbols per channel use).

It is possible to generalise this idea in the same way that was done above. However, it must be noted that if we apply this procedure to the QO-STFBC (and not the QO-SFBC scheme as in the previous paragraph) scheme presented FIG. 12, we obtain an Alamouti-like scheme (SC-OSFBC) that is repeated in time, to obtain a rate ½ scheme. This seems to be the more natural (not necessarily the most efficient) way to obtain a rate-½ scheme.

Figure 14:
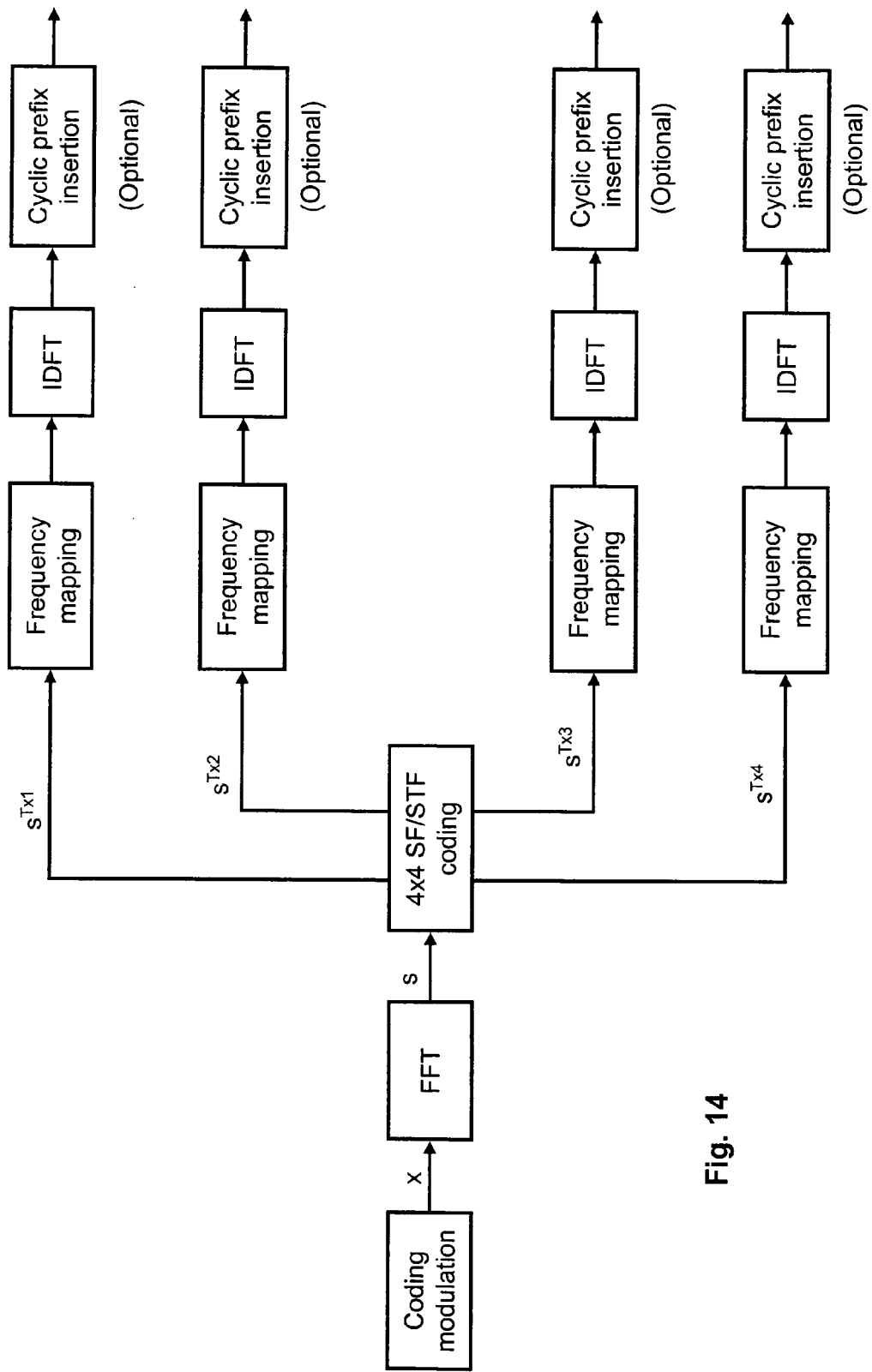
FIG. 14 represents an example of frequency implementation of the encoder.
Figure 15:
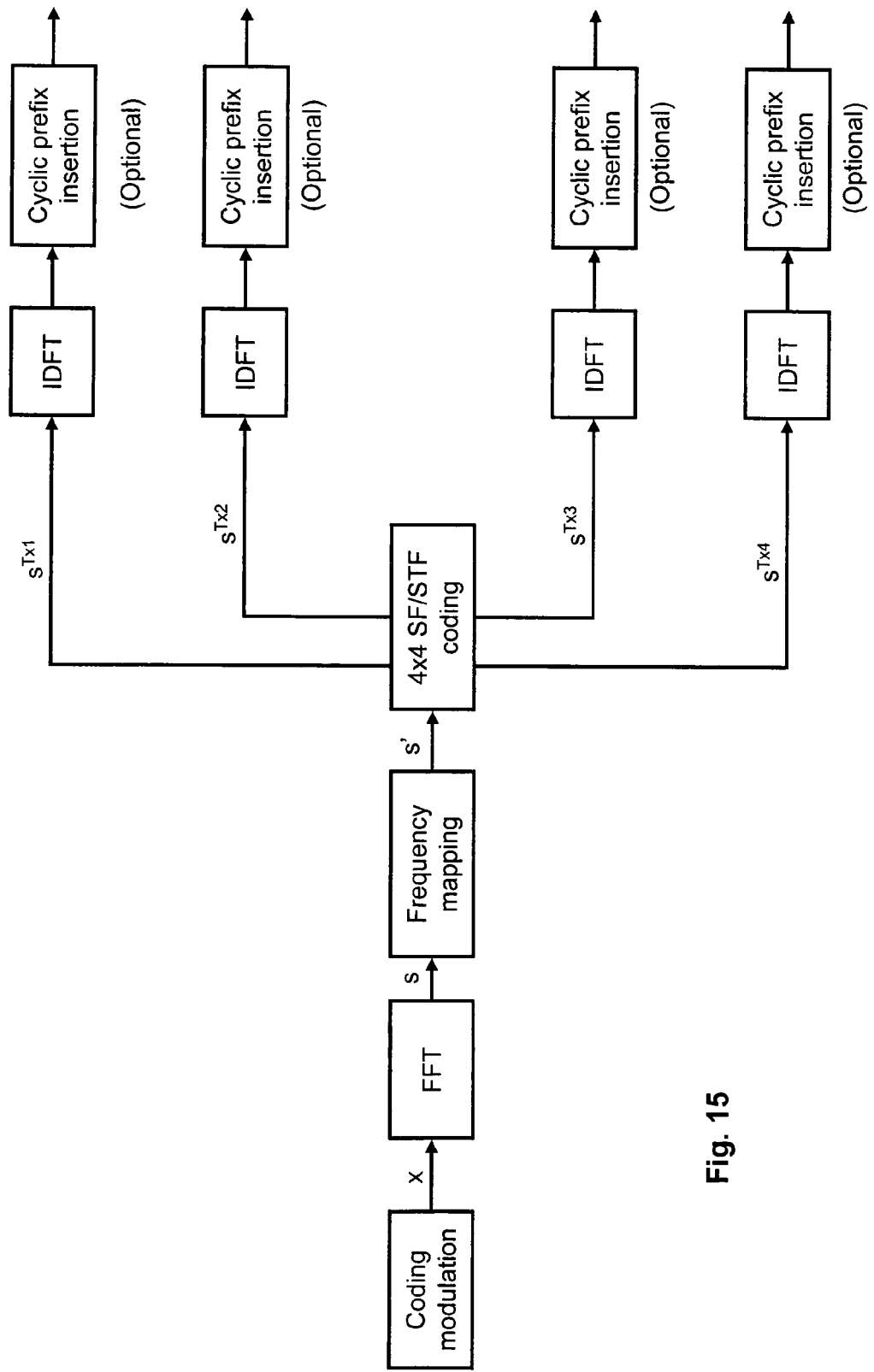
FIG. 15 represents a second example of frequency implementation of the encoder.

A first variant of the frequency implementation of the encoder for all the schemes presented above is provided in FIG. 14 and a second one in FIG. 15. Differences between the two implementations are trivial, and correspond to the placement of the SFBC coding function with respect to the frequency mapping function. The frequency mapping function contains also the zero insertion, pulse shaping module and else as needed. It must be noted that these implementations are very general, and applicable to any SF/ST/STF coding, including the classical ones not addressed by this patent proposal. The invention part is included in the "SF/STF coding" block, corresponding to the formulas provided for each method.

Figure 16:
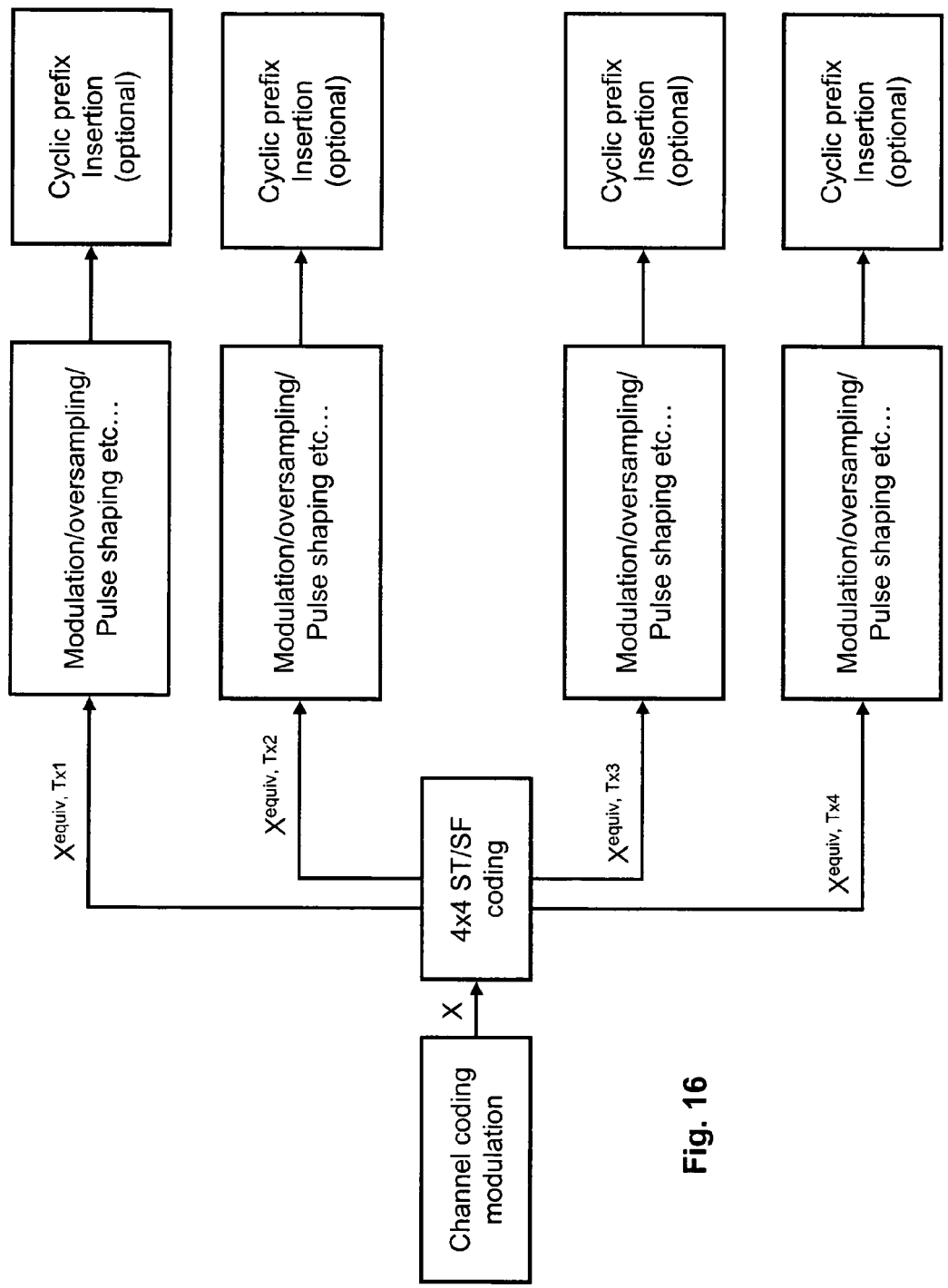
FIG. 16 represents an example of time implementation of the encoder.

An implementation in the time domain of the encoder is presented in FIG. 16. Once again, this implementation is very general. The invention part relies in the '4×4 ST coding' block, corresponding to the formulas provided in (11) or their equivalent for the STFBC-type codes.

Figure 17:
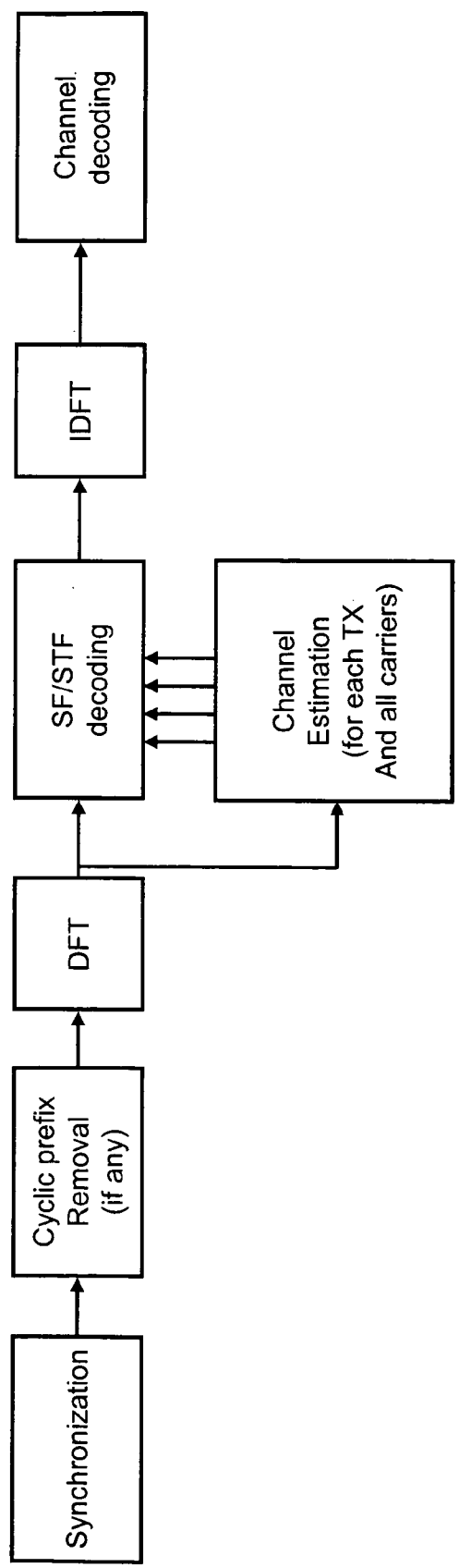
FIG. 17 represents an example of frequency implementation of the receiver with one antenna.
Figure 18:
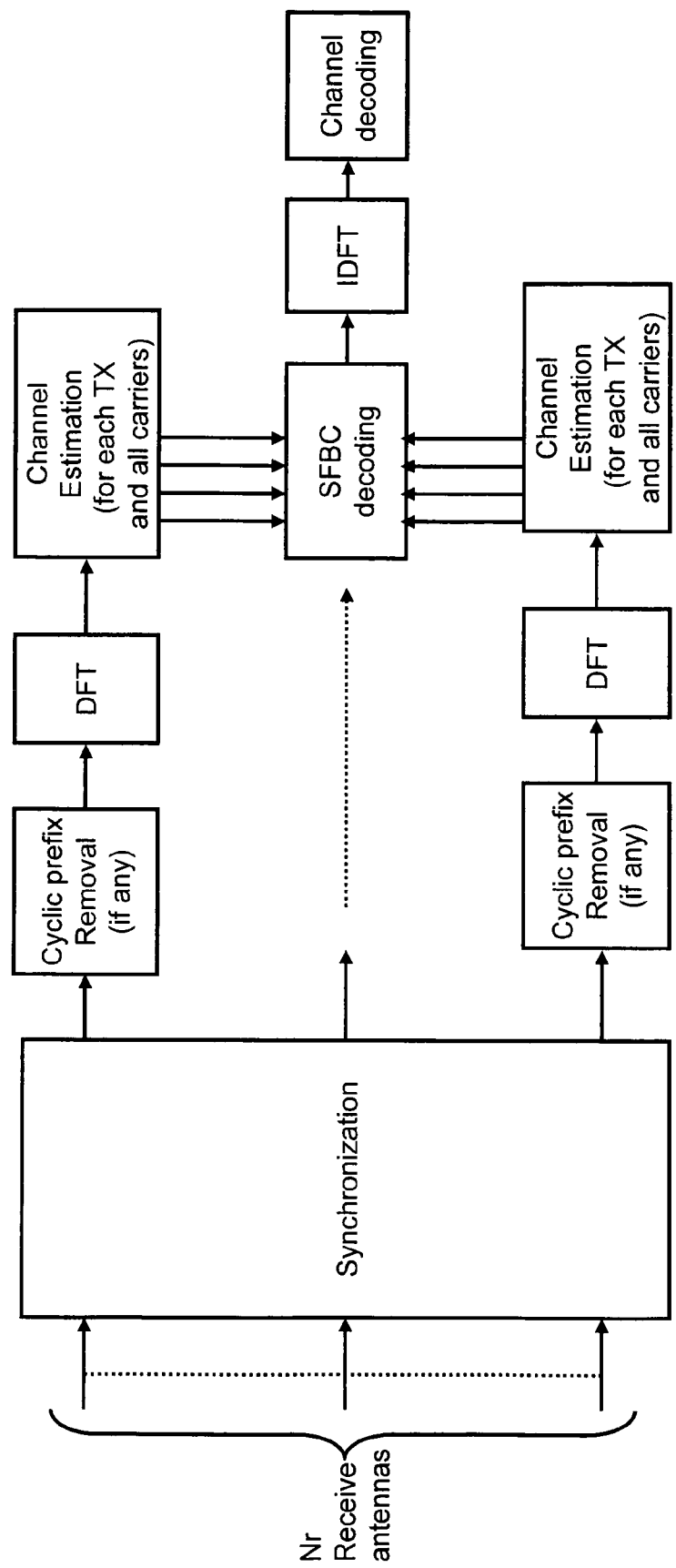
FIG. 18 represents an example of frequency implementation of the receiver with Nr antennas.

An implementation of the decoder is presented in FIG. 17 for one receive antenna, and in FIG. 18 for several receive antennas. To benefit from the characteristics of the invention, the decoding is performed preferably in the frequency dimension. This implementation is very general still. The invention relies partly in the SF/STF decoding block itself, but also in the possibility to perform this kind of simple decoding, at least for most of the presented schemes, with the SF/STF decoding block processing a subset of four carriers only at a time, the different subsets of carriers being decoded independently one from each other. This last property is not fulfilled by most of the schemes that would have been defined in the time dimension inside one block. On the other hand, a classical QO-SFBC scheme performed on adjacent sub-carriers will have this property also, but not with the constant envelope characteristic.

Concerning the complexity of the SF/STB-BC decoding in the multi-antenna case (FIG. 18, Nr receive antennas), the MMSE decoder (as an example of possible decoder) will consist in a matched filter (multiplication by a complex matrix of size 4×4Nr, or a real matrix of size 8×8Nr), following at most by the resolution of a 4×4 complex linear system (or the resolution of a 8×8 real linear system). The corresponding complexity is affordable anyway.

Concerning the MMSE MIMO decoding and the application to QOSFBC, let us consider that the code $A^{(I)}$ described by equation (6) (with the conventions (8) and (9)) is used in a system with NTx=4 transmit antennas and NRx receive antennas. Decoding will be separately performed on groups of 4 subcarriers with index ($k_1$, $k_2$, $k_3$, $k_4$) where the relationship between the indexes is the one given in (8). Let s be a vector formed by the four symbols designated in (9):

$$s = \begin{bmatrix} s_{k_1} \\ s_{k_2} \\ s_{k_3} \\ s_{k_4} \end{bmatrix} \quad (30)$$

Let y be the 4NRx-sized received column vector, built as:

$$y = \begin{bmatrix} y_{f_{k_1}} \\ y_{f_{k_2}} \\ y_{f_{k_3}} \\ y_{f_{k_4}} \end{bmatrix}, \text{ with } y_{f_{k_l}} = \begin{bmatrix} y_{f_{k_l},1} \\ y_{f_{k_l},2} \\ \vdots \\ y_{f_{k_l},NRx} \end{bmatrix}, \quad l = 1 \ldots 4 \quad (31)$$

where $y_{f_{k_l},i}$ is the sample received on the $k_l$-th used subcarrier ($f_{k_l}$) on receive antenna i.

Let us denote by $H_{i,j,f_k}$ the channel coefficient corresponding to a transmission from the jth transmit antenna (j=1 ... 4) to the ith receive antenna (i=1 ... NRx) on the kth used subcarrier $f_k$. Let us also define the following matrices:

$$H_{f_{k_l}}^{j_1 j_2} = \begin{bmatrix} H_{1,j_1,f_{k_l}} & H_{1,j_2,f_{k_l}} \\ H_{2,j_1,f_{k_l}} & H_{2,j_2,f_{k_l}} \\ \vdots & \vdots \\ H_{NRx,j_1,f_{k_l}} & H_{NRx,j_2,f_{k_l}} \end{bmatrix}, \quad (32)$$

$l = 1 \ldots 4, \quad j_{1,2} = 1 \ldots 4.$

With these definitions, we can model the transmission under the linear form:

$$y' = Hs' + \eta, \quad (33)$$

where:

$$s' = \begin{bmatrix} s_{k_1} \\ -s_{k_2}^* \\ s_{k_3}^* \\ s_{k_4} \end{bmatrix}, \quad y' = \begin{bmatrix} y_{f_{k_1}} \\ y_{f_{k_2}}^* \\ y_{f_{k_3}}^* \\ y_{f_{k_4}} \end{bmatrix} \quad (34)$$

and $$H = \begin{bmatrix} H_{f_{k_1}}^{12} & H_{f_{k_1}}^{34} \cdot \begin{pmatrix} 0 & 1 \\ -1 & 0 \end{pmatrix} \\ H_{f_{k_2}}^{*12} \cdot \begin{pmatrix} 0 & -1 \\ 1 & 0 \end{pmatrix} & H_{f_{k_2}}^{*34} \\ H_{f_{k_3}}^{*34} \cdot \begin{pmatrix} 0 & -1 \\ 1 & 0 \end{pmatrix} & H_{f_{k_3}}^{*12} \\ H_{f_{k_4}}^{34} & H_{f_{k_4}}^{12} \cdot \begin{pmatrix} 0 & 1 \\ -1 & 0 \end{pmatrix} \end{bmatrix}, \quad (35)$$

and $\eta$ is an additive white Gaussian noise of variance $\sigma^2$.

If we want to decode the code $A^{(II)}$ described by equation (7) (with the same conventions (8) and (9)), equation (33) still holds but s' and H are to be defined as following:

$$s' = \begin{bmatrix} s_{k_1} \\ s_{k_2}^* \\ s_{k_3}^* \\ -s_{k_4} \end{bmatrix}, \quad (36)$$

$$H = \begin{bmatrix} H_{f_{k_1}}^{12} & H_{f_{k_1}}^{34} \cdot \begin{pmatrix} 0 & -1 \\ 1 & 0 \end{pmatrix} \\ H_{f_{k_2}}^{*12} \cdot \begin{pmatrix} 0 & 1 \\ -1 & 0 \end{pmatrix} & H_{f_{k_2}}^{*34} \\ H_{f_{k_3}}^{*34} \cdot \begin{pmatrix} 0 & 1 \\ -1 & 0 \end{pmatrix} & H_{f_{k_3}}^{*12} \\ H_{f_{k_4}}^{34} & H_{f_{k_4}}^{12} \cdot \begin{pmatrix} 0 & -1 \\ 1 & 0 \end{pmatrix} \end{bmatrix} \quad (37)$$

Equivalent matrices can be defined for the SC-STFBC code. All the equations above remain valid by replacing $$s_{k_1} \to s_{k_1}^{t_1}, s_{k_2} \to s_{k_2}^{t_1}, s_{k_3} \to s_{k_1}^{t_2},$$

$$s_{k_4} \to s_{k_2}^{t_2} \text{ and } H_{f_{k_l}}^{j_1 j_2}\big|_{l=1,2} \to H_{f_{k_l},t_1}^{j_1 j_2}, H_{f_{k_l}}^{j_1 j_2}\big|_{l=3,4} \to H_{f_{k_l},t_2}^{j_1 j_2}.$$

More generally, such a transformation exists for all QO schemes envisaged in this document, and a linear representation exists to model the transmission.

Once the linearization relationship (33) established, the code can be easily decoded, for example by using a classical MMSE (Minimum Mean Square Error) decoder:

$$\hat{s}'|_{MMSE} = \underbrace{(H^H H + \sigma^2 I_4)^{-1} H^H}_{H_{MMSE}} \cdot y'. \quad (38)$$

We denoted by $(.)^H$ the transpose and complex conjugate operation; $I_4$ stands for the identity matrix of order 4.

A ZF (zero forcing) approach would result in:

$$\hat{s}'|_{ZF} = \underbrace{(H^H H)^{-1} H^H}_{H_{ZF}} \cdot y'. \quad (39)$$

It is to be noted that in a more complicated and very classical way, a ML decoder can be envisaged, as soon as a linear channel model (33) is valid.

The previous QO schemes might present a degradation of performance in case of very high spatial correlation between the different transmit antennas. For the particular encoding A matrices that were proposed to be used for the QO schemes, it can be proven mathematically that some eigenvalues of the matrix $H^H H$ used in the MMSE receiver (see annex 1) tend to zero when the spatial correlation tends to one, and that this leads to a performance degradation for the MMSE receiver. This performance degradation is verified by simulations for high spatial correlation. Moreover, it can be shown that such a characteristic will decrease the performance for most receiver algorithms that we can think of (zero forcing or ML for example).

Figure 19:
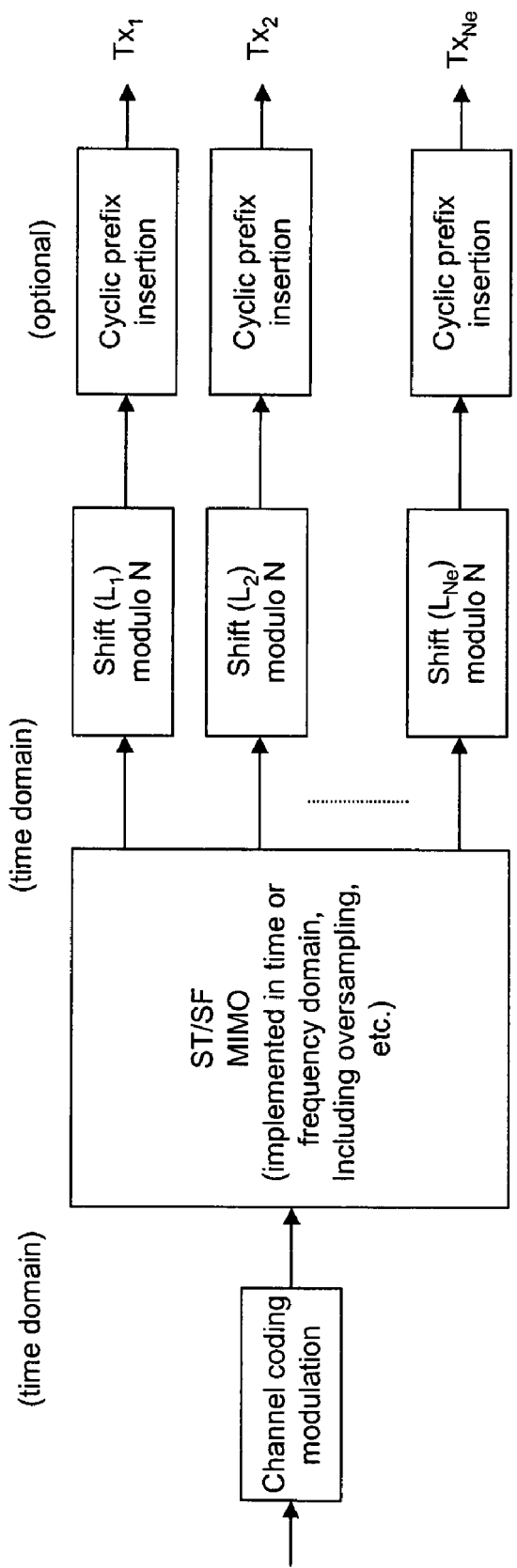
FIG. 19 represents an encoder with time shifting modules.
Figure 20:
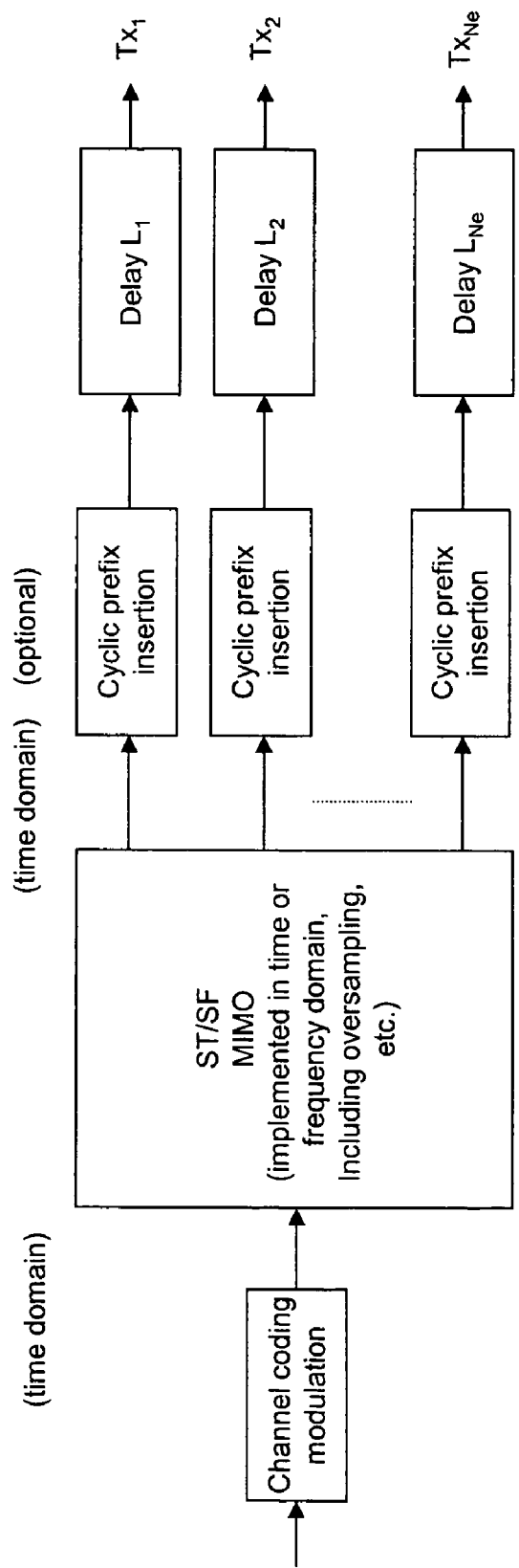
FIG. 20 represents an encoder with delay modules.

A very simple way to roughly overcome this problem is to spatially decorrelate the different transmit antennas, by means of delays or preferably cyclic shifts in the time domain. FIG. 19 represents an encoder according to any of the MIMO schemes described above in which shift operations have been introduced with shifting values not being all equal on each transmit antenna. The shift is a time shift of the indicated value $L_i$ lower than the size N of the coding sequence. The shift is done modulo N. FIG. 20 represents another embodiment of the encoder where delay operations of value $L_i$ have been used instead of the shift. Both, shifting or delay operations lead to decorrelate the different antennas improving notably the performance in case of high spatial correlation.

The invention can be applied to any transmission system that will use several transmitters. It is very likely to concern wireless systems; however, it could be used e.g. to line transmissions in which cross-over interference would occur or in any other system where peak to average power ratio might be an issue. Moreover, it was described in SC-FDMA/DFT-spread OFDM context. However, any modulation scheme could use the proposed invention, even if a real benefit will only occur for modulations with low envelope variations. Concerning the cyclic prefix, it simplifies the receiver implementation in the frequency domain. However, other frequency domain implementation should be possible without it, even if it would be more complex. Examples of such implementation are overlap methods (e.g. overlap-add or overlap-save). In overlap-save method, N received samples will be treated in the frequency domain, and only K will be kept in the time domain. The corresponding treatment windows are overlapping to insure that all the received samples are treated.

The invention claimed is:

1. A method of radio data emission, by an emitter including at least one group of four transmit antennas comprising: generating a first signal, S, to be transmitted on a first antenna being considered in the frequency domain as resulting from a discrete Fourier transform (DFT) of size M, M being an integer, leading to emission of a symbol on each of M sub carriers on the first antenna, wherein a function SC(p) is defined by $S_k^{Ts}=(-1)^{k+1}S^*_{(p-1-k)modM}$, for k=0 to M−1 and produces a second signal to be emitted on a second antenna Ts from the first signal S to be emitted on the first antenna, wherein p is a parameter between 0 and M−1 and k is an index for each sub carrier in the frequency domain, each group of four antennas defining two pairs of antennas;
  emitting on each antenna a signal such that:
    for each group, any incomplete group comprising from one to three antennas is treated as a complete group in which some antennas are suppressed afterward;
    signals emitted on the antennas of each pair in each group are related by a first relationship the function SC(p);
    a signal emitted on one of the antennas of a first pair and a signal emitted on one of a antennas of a second pair is related by a second relation that preserves a single carrier property; and
    a signal emitted on one of the antennas of a first group of four antennas and a signal emitted on one antenna of any other group is related by a third relation that preserves the single carrier property.

2. The method of radio data emission according to claim 1, wherein the second relation is the relation Shift(p) defined by $S_k^{Tr}=S_{(k-p)modM}$ for k=0 to M−1.

3. The method of radio data emission according to claim 2, wherein p=M/2.

4. The method of radio data emission according to claim 1, wherein the second relation is the relation Flip(p) defined by $S_k^{Tr}=S_{(M-1-k+p)modM}$ for k=0 to M−1.

5. The method of radio data emission according to claim 1, wherein the second relation is the relation Altconj defined by $S_k^{Tr}=(-1)^k S^*_k$ for k=0 to M−1.

6. The method of radio data emission according to claim 1, wherein the second relation is the conjugate function.

7. The method of radio data emission according to claim 1, wherein the second relation is the identity function.

8. The method of radio data emission according to claim 1, wherein the third relation is the Shift function.

9. The method of radio data emission according to claim 1, wherein the second relation is applied to symbols of the same time slot.

10. The method of radio data emission according to claim 1, wherein the second relation is applied to symbols of different time slots.

11. The method of radio data emission according to claim 10, wherein the second relation is applied to symbols of consecutive time slots.

12. A method of radio data emission according to claim 1, wherein a time shift operation is introduced on each transmit antenna, a shifting value $L_i$ applied to each antenna being lower than a size N of the coding sequence, N being an integer, the shifting values $L_i$ applied to the antennas not being all equal, and the shifting value $L_i$ applied to each antenna being applied modulo N.

13. A method of radio data emission according to claim 1, wherein a time delay operation is introduced on each transmit antenna, and delay values applied to the antennas not being all equal.

14. A radio data emitter, comprising:
  at least one group of four transmit antennas, a first signal, S, to be transmitted on a first antenna being considered in the frequency domain as resulting from a discrete Fourier transform (DFT) of size M, M being an integer, leading to emission of a symbol on each of M sub carriers on the first antenna, wherein a function SC(p) is defined by $S_k^{Ts}=(-1)^{k+1}S^*_{(p-1-k)modM}$, for k=0 to M−1 and produces a second signal to be emitted on a second antenna Ts from the first signal S to be emitted on the first antenna, wherein p is a parameter between 0 and M−1 and k is an index for each sub carrier in the frequency domain, each group of four antennas defining two pairs of antennas; and
  means for emitting on each antenna a signal such that:
    for each group, any incomplete group comprising from one to three antennas is treated as a complete group in which some antennas are suppressed afterward;
    signals emitted on the antennas of each pair in each group are related by a first relationship, the function SC(p);
    a signal emitted on one of the antennas of a first pair and a signal emitted on one of the antennas of a second pair is related by a second relation that preserves a single carrier property; and
    a signal emitted on one of the antennas of a first group of four antennas and a signal emitted on one antenna of any other group is related by a third relation that preserves the single carrier property.

15. A radio data receiver, comprising:
  a decoder configured to decode signals transmitted according to claim 14.

* * * * *